US007439429B2

(12) United States Patent
Wood et al.

(10) Patent No.: US 7,439,429 B2
(45) Date of Patent: Oct. 21, 2008

(54) WIND INSTRUMENT HAVING A MODIFIED TONE-RICH SURFACE

(76) Inventors: James Wood, 9425 S. Riverside Dr., #1725, Sandy, UT (US) 84070; Tevis Laukat, 10016 S. Rockview Cir., Sandy, UT (US) 84092; Randal Clark, 14228 Emmeline Dr., Herriman, UT (US) 84065

( * ) Notice: Subject to any disclaimer, the term of this patent is extended or adjusted under 35 U.S.C. 154(b) by 79 days.

(21) Appl. No.: 11/306,954

(22) Filed: Jan. 17, 2006

(65) Prior Publication Data

US 2007/0163421 A1 Jul. 19, 2007

(51) Int. Cl.
*G01D 7/08* (2006.01)

(52) U.S. Cl. .................................................... 84/385 R

(58) Field of Classification Search ................ 84/385 R
See application file for complete search history.

(56) References Cited

U.S. PATENT DOCUMENTS

| | | | |
|---|---|---|---|
| 11,215 A | 7/1854 | Elsenbrandt | |
| 706,557 A | 8/1902 | Heckel | |
| 1,317,219 A | 9/1919 | Price | |
| 1,328,038 A | 1/1920 | Enders | |
| 1,505,359 A | 8/1924 | Loomis | |
| 1,585,295 A | 5/1926 | Loomis | |
| 1,616,662 A | 2/1927 | Loomis | |
| 1,632,008 A | 6/1927 | Lemm | |
| 1,677,563 A | 7/1928 | Loomis | |
| 1,705,563 A | 3/1929 | Gibert | |
| 1,706,796 A | 3/1929 | Loomis | |
| 1,716,929 A | 6/1929 | Manning | |
| 1,735,411 A | 11/1929 | Powel | |
| 1,828,389 A | 10/1931 | Calvani | |
| 1,873,184 A | 8/1932 | Calvani | |
| 2,033,774 A | 3/1936 | Loomis | |
| 2,055,382 A | 9/1936 | Loomis | |
| 2,133,624 A | 10/1938 | Loomis | |
| 2,133,625 A | 10/1938 | Loomis | |
| 2,151,337 A | 3/1939 | Selmer | |
| 2,183,423 A | 12/1939 | Christensen | |
| 2,533,389 A * | 12/1950 | Meyers | 84/385 R |

(Continued)

OTHER PUBLICATIONS

1932 CONN SAX, Dec. 20, 2005 (Date Site visited) http://www.xs4all.nl/~cderksen/Conn6MT1932image.html.

(Continued)

*Primary Examiner*—Walter Benson
*Assistant Examiner*—Robert W Horn
(74) *Attorney, Agent, or Firm*—Advantia Law Group; Michael W. Starkweather; Jason P. Webb

(57) ABSTRACT

A wind instrument with improved tonal characteristics by positioning an octave hole, an octave key mechanism, and/or a water key on a surface of the wind instrument that is not a tone-rich region. The wind instrument may be a woodwind instrument such as a saxophone or a brass instrument such as a trumpet. The octave hole may be placed on a concave portion of a curve in the wind instrument. The octave hole may be covered by an octave key mechanism that opens the octave hole using the same fingering that would open an octave key in a typical wind instrument. The water key may be placed on a portion of the body of the wind instrument that is not a tone-rich region of the wind instrument.

19 Claims, 10 Drawing Sheets

U.S. PATENT DOCUMENTS

| | | | | |
|---|---|---|---|---|
| 2,555,980 | A | 6/1951 | Loney | |
| 2,846,917 | A | 8/1958 | Lefevre-Selmer | |
| 2,951,414 | A | 9/1960 | Christensen | |
| 3,177,720 | A * | 4/1965 | Metheny | 236/99 R |
| 3,500,731 | A * | 3/1970 | Bresson et al. | 396/207 |
| 3,657,464 | A | 4/1972 | Pascucci | |
| 3,789,721 | A | 2/1974 | Paladino | |
| 3,848,503 | A | 11/1974 | Paladino | |
| 3,850,071 | A | 11/1974 | Paladino | |
| 3,865,005 | A | 2/1975 | Carree | |
| 4,148,242 | A | 4/1979 | Woehr et al. | |
| 4,250,791 | A | 2/1981 | Tairadate | |
| 4,341,146 | A | 7/1982 | Massa | |
| 4,453,445 | A | 6/1984 | Todd | |
| 5,208,411 | A * | 5/1993 | Satoh | 84/385 R |
| 5,620,295 | A * | 4/1997 | Nishi | 414/416.11 |
| 5,900,562 | A | 5/1999 | Smeding | |
| 5,990,398 | A * | 11/1999 | Nonaka | 84/385 R |
| 6,143,969 | A | 11/2000 | Lin | |
| 6,265,649 | B1 * | 7/2001 | Smeding | 84/385 R |
| 6,476,302 | B1 * | 11/2002 | Liu | 84/385 R |
| 6,977,331 | B2 * | 12/2005 | Lin | 84/385 R |
| 2003/0070890 | A1 * | 4/2003 | Wang | 188/79.51 |
| 2007/0163421 | A1 * | 7/2007 | Wood et al. | 84/380 R |

OTHER PUBLICATIONS

1938 CONN SAX, Dec. 20, 2005 (Date Site Visited) http://www.xs4all.nl/~cderksen/Conn6M1936image.html.

"Yanagisawa Saxophone Necks (Bocals) from Eltham Woodwind and Brass." Eltham Woodwind and Brass. <http://www.elthamwoodwind.com.au/yanagisawa/bocal.html>.

"Saxophone Necks by Peter Ponzol." Peter Ponzol: Handcrafted Saxophone Products. <http://www.peterponzol.com/neck_info/neck_information.htm>.

"PM Woodwind Repair: Saxophone Repair, Used Saxophones, Selmer, Mark VI, Paul Masli . . . " PM Woodwind. <http://www.pmwoodwind.com/instruments.cfm?categoryid=61>.

"Selmer (Paris) Serie III Polished Brass, Matte lacquered Alto saxophone: Neck from Top." SaxForte. <http://www.saxforte.com/saxophones/Eb_Alto/Eb_Alto_Selmer_Paris_/Serie.

"The Glober Crook." Stephen Howard Woodwind Instrument Repairs & Restoration. <http://www.shwoodwind.co.uk/Buying/Gloger.htm>.

"Unison Saxophone Necks." Hollywoodwinds. <http://www.unisonsaxophone.com/necks.html>.

"Home / Musikinstrumente / Orchesterinstrumente / Holzblasinstrumente / Saxophone / G1." Yamaha Deutschland. <http://www.yamaha_europe.com/yamaha_europe/germany/10_musical_.

* cited by examiner

WIND INSTRUMENT HAVING A MODIFIED TONE-RICH SURFACE

BACKGROUND OF THE INVENTION

1. Field of the Invention

The present invention relates generally to wind instruments, and, more particularly, to wind instruments having improved tonal characteristics by modifying the tone-rich region.

2. Description of the Related Art

Wind instruments are typically those in which sound is produced by a player setting a column of air into vibration by blowing into or over a mouthpiece. Wind instruments include both brass and woodwind instruments. Tones produced by the instrument may be varied by adjusting the length of the column of vibrating air, opening and/or closing valves or keys, thus changing an effective length, changing the length via sliding tubing, vibrating the column of air at different frequencies, and combinations of the above-techniques.

Woodwinds typically have an inherent problem with maintaining the correct pitch. This problem is especially inherent in the saxophones. As the instrument ascends the scale, it deviates from its optimum pitch level. This deviation represents itself by becoming more sharp (i.e., at higher frequency than is desired). B flat tenor saxophones, for example, generally begin to deviate at F sharp (at the fifth line treble clef or 329.6 Hz, concert E) and then reach the highest point of deviation at a B above the staff (440 Hz, concert A).

This presents a significant problem whereby as the frequencies of the overtones deviate from the optimum frequencies, or the volume of the overtone that is played at an incorrect frequency increases, the perceived tonal characteristics of the instrument may deteriorate. Many people, especially those who have been musically trained, are capable of detecting a difference in frequency between two separate sounds which is as little as 2 Hz.

Various instruments are more unstable than others. For example, the saxophone is more difficult to play as it is slightly unstable when played. That is, many notes will deviate a small amount from the desired pitch level (i.e., frequency) even though the correct keys are being depressed. As such, the saxophone player must adjust the pitch by altering their blowing technique to force the saxophone into the proper pitch. Since those who have been musically trained are often capable of detecting a difference in frequency between two separate sounds which is as little as 2 Hz, even a slight improvement in one or more of the overtones of a particular note played, and/or a decrease in volume of an overtone with a frequency different from the correct frequency, can have a significant impact on the tonal characteristics of the overall sound of the wind instrument.

The general configuration of the various instruments categorized as saxophones has not changed since its inception in the mid 1800's. For example, the tenor saxophone includes a U-shaped horn with various keys along the horn that are used to selectively cover tone holes in the saxophone. Each key is operated by depressing a lever or key against the tone hole. Some of the keys have conventionally included an insert formed from mother of pearl. The mother of pearl inserts were provided for decorative purposes and to provide a material that generally maintains its luster after extended use and subsequent wear, although mother of pearl does wear out eventually, whereas, brass keys tend to tarnish and actually physically erode over time.

Producing a correct pitch in a brass instrument may be difficult. Often when a single note is played, the instrument produces not only the note, but a series of overtones as well. If the overtones do not have frequencies at the proper levels, the overtones reduce the sound quality of the note played. Often in brass instruments, the overtones deviate from the desired frequencies. Brass instruments are often designed such that particular positions of valves, slides, and the like produce different notes. For example, a trumpet is designed such that the tones of a trumpet are played by depressing valves to vary the length of the tubing. This technique is generally called "slotting," that is, the technique of depressing certain keys to generate a particular tone. A particular note is slotted by depressing the correct valve, or combination of valves. One difficulty in playing a valved brass instrument is that the overtones may not be slotted correctly. That is, though the instrument may be slotted to play the fundamental note correctly, the player may be required to vary the method of buzzing into the instrument to bring the overtones into a correct range, thereby improving the tonal characteristics of the tone played. Thus it remains difficult to play a valved brass instrument because the player is required to correct the pitch due to the overtones deviating from the desired frequencies.

Wind instruments may include a hole and covering along the tubing of the instrument. Many wind instruments, for example, include an octave key. The octave key may raise the pitch of the wind instrument. The saxophone, for example, typically includes an octave key mounted on the top of the neck of the instrument, near the mouthpiece. Clarinets typically include a register key that raises the pitch by a twelfth. Other instruments include water keys at a point on the body of the instrument. Trumpets, for example, typically include a water key along an outer surface of the return side of the body. Typically trumpet water keys face away from the player when the trumpet is played in its regular technique.

Accordingly, attempts have been made to improve, among other things, the tonal characteristics and ease of play of wind instruments. For example, Powell discloses, in U.S. Pat. No. 1,735,411, a saxophone, having a neck provided with an octave opening on its left side, considered with reference to the way the instrument is held in playing, a pad which covers and uncovers said opening, a lever which carries said pad, and a second lever which actuates the first lever and has its fulcrum parallel with the fulcrum of the first lever.

In another patent involving the octave key of a saxophone, Loomis discloses, in U.S. Pat. No. 2,033,774 a wood wind instrument with a straight body, a curved mouth pipe in axial continuation thereto, an upper octave hole being located on the concave side of said mouth pipe, an upper octave key extending along the concave side of said mouth pipe, an abutment bar overlying the straight body, a hinge supported from said body, links extending from said hinge to a bar parallel to said abutment bar, additional links extending from said parallel bar to the abutment bar, means for rocking the hinge to actuate the abutment bar and upper octave key, a lower octave hole being located on the straight body, a lower octave key and means extending from the lower octave key to one of said last named links, whereby upon operation of said lower octave key independent of said first named hinge rocking means actuation of the upper octave key.

Furthermore, Massa discloses, in U.S. Pat. No. 4,341,146, a musical instrument combining a modified portion of a tenor saxophone with a modified portion of a soprano saxophone joined together by means of a bracket whereby one of the two instruments can be moved relative to the other to obtain proper alignment whereby the two instruments can be played simultaneously. Each of the two instruments is provided with its own mouthpiece whereby a musician may play two notes simultaneously. Each instrument is also fitted with a trumpet bell outlet. The standard octave key and a post holding the octave key to the soprano saxophone may be moved downwardly from their normal position to give clearance for a mouthpiece attached to said soprano saxophone so that it may be moved for tuning purposes.

Heckel discloses, in U.S. Pat. No. 706,557 improvements in clarinets in which two octave-holes are opened or kept open by the pressure upon a single-octave key. In the generally-employed instruments belonging to the class of the clarinets, contrabass clarinets—the octave-key is also used for the "B" key, so that from the same hole the tone "B" is obtained.

The cited disclosures do not address the problem of correcting overtones in wind instruments. What is needed is a wind instrument that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available wind instruments. Accordingly, the present invention has been developed to provide a wind instrument comprising a neck and a body tube through which a column of air may be vibrated to produce sound, wherein the neck includes a tenon for coupling with the body tube, a lower surface on a concave side of the neck, an octave hole located on the lower surface, and a means for uncovering said octave hole.

In one embodiment, the means for uncovering may include a first lever, with an octave key on one end thereof, a contact point on another end thereof, and a pivot point between the octave key and the contact point, around which the first lever has rotational freedom, and a second lever, with a contact point on one end thereof, contacting the contact point of the first lever, an octave hole cover on the other end thereof positioned to cover the octave hole, and a pivot point between the contact point and the octave hole cover, around which the second lever has rotational freedom. The means may include a biasing mechanism for biasing the octave hole cover toward the octave hole.

In another embodiment, the octave key may couple to an octave key mechanism of a body tube of the wind instrument.

In yet another embodiment the first lever may further include a clasp for contacting the second lever on two points.

The wind instrument may be one selected from the group consisting of: arghul, aulochrome, basset horn, clarinet, E-flat clarinet, alto clarinet, bass clarinet, contra-alto clarinet, contrabass clarinet, launeddas, mijwiz, rothphone, sarrusophone, saxophone, soprillo, sopranino saxophone, soprano saxophone, alto saxophone, tenor saxophone, C melody saxophone, baritone saxophone, bass saxophone, contrabass saxophone, subcontrabass saxophone, tubax, tárogáto, bassanelli, bassoon, contrabassoon, bombarde, duduk, dulcian, dulzania, guan, heckelphone, piccolo heckelphone, hojok, mizmar, nadaswaram, oboe, piccolo oboe, oboe d'amore, English horn, oboe da caccia, racket, shawm, shehnai, suona, surnay, tromboon, trompeta china, zurna, bagpipes, cornamuse, crumhorn, hirtenschalmei, kortholt, rauschpfeife, bansuri, flute, fife, piccolo, Western concert flute, alto flute, bass flute, contrabass flute, ryuteki, hocchiku, kaval, ney, quena, shakuhachi, flageolet, gemshorn, ocarina, recorder, tin whistle, penny whistle, tonette, trumpet, bass trumpet, flumpet, French horn, tuba, Wagner tuba, trombone, superbone, bugle, sousaphone, mellophone, euphonium, flugelhorn, saxhorn, cornet, cornetto, serpent, sackbut, bazooka, horn, ophicleide, didgeridoo, shofar, conch alphorn, cimbasso, and keyed trumpet. In one embodiment, the wind instrument is a saxophone.

In still another embodiment, the neck may include a cross section that is substantially circular. The lower surface may include no greater than 180° of a circumference of the substantially circular cross section of the body. The lower surface may include no greater than 120° of a circumference of the substantially circular cross section of the body.

In a further embodiment, the present invention discloses a wind instrument with improved tonal characteristics, comprising a lower surface, and a water key on the lower surface. The wind instrument may further include a substantially circular cross section, a tone-rich region which includes about 120° of the substantially circular cross section, and the lower surface does not include the tone-rich region. The wind instrument may be a trumpet.

In one embodiment, the trumpet includes a return, and the water key is on the return. The trumpet may further include a bell, and the water key is located on a lower surface of the return directed away from the bell.

In another embodiment, the water key includes a lever directed substantially upwardly when the trumpet is held in a regular playing position.

In a further embodiment, the present invention discloses a wind instrument comprising a body in which a column of air may be vibrated to produce sound, wherein the body comprises a neck coupled to the body tube, wherein the neck comprises a tenon for coupling with the body tube, a tone-rich region on a convex side of the neck, an octave hole located on the tone-rich region, and a means for uncovering said octave hole, wherein said means only contacts the tone-rich region at the octave hole.

In one embodiment, the means may include a lever with an octave key at one end, an octave hole cover at another end, and a pivot between the octave key and the octave hole cover, around which the liver has rotational freedom. The means may include a biasing mechanism for biasing the octave hole cover toward the octave hole. The biasing mechanism may be a spring for providing a force directed toward the neck to a point between the octave key and the pivot point.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
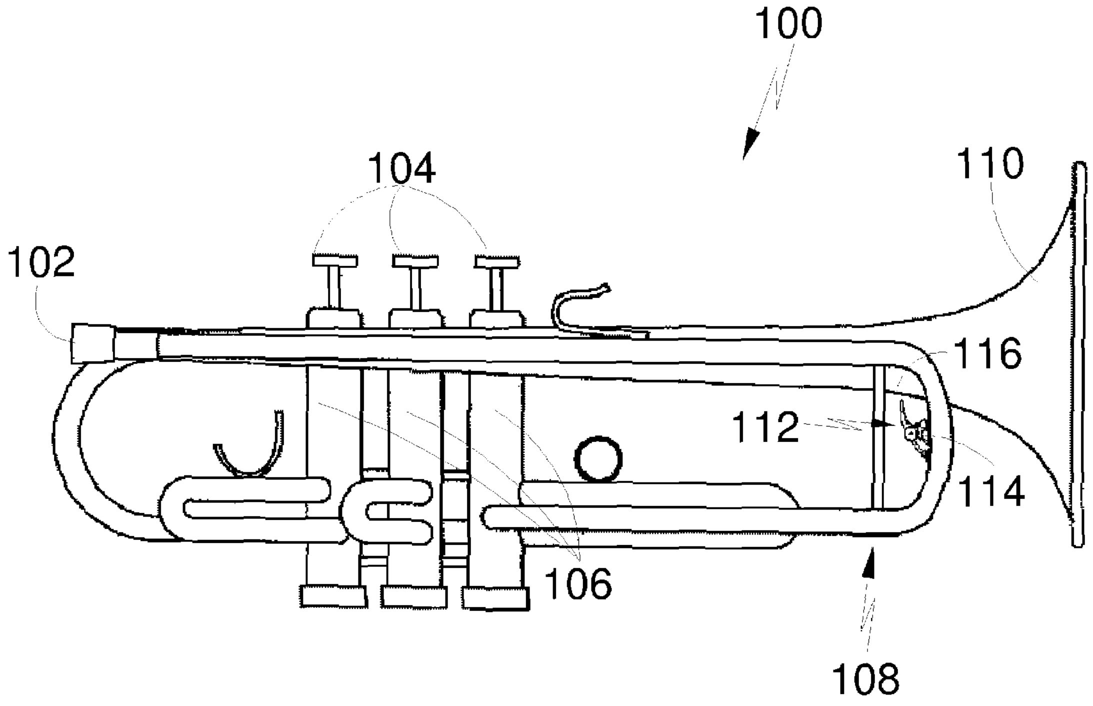
FIG. 1 illustrates a side plan view of a wind instrument according to one embodiment of the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to “one embodiment,” “an embodiment,” or similar language means that a particular feature, structure, or characteristic described in connection with the embodiment is included in at least one embodiment of the present invention. Thus, appearances of the phrases “one embodiment,” “an embodiment,” and similar language throughout this specification may, but do not necessarily, all refer to the same embodiment, different embodiments, or component parts of the same or different illustrated invention. Additionally, reference to the wording “an embodiment,” or the like, for two or more features, elements, etc. does not mean that the features are related, dissimilar, the same, etc. The use of the term “an embodiment,” or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as “another embodiment,” the identified embodiment is independent of any other embodiments characterized by the language “another embodiment.” The independent embodiments are considered to be able to be combined in whole or in part one with another as the claims and/or art may direct, either directly or indirectly, implicitly or explicitly.

As used herein, “comprising,” “including,” “containing,” “is,” “are,” “characterized by,” and grammatical equivalents thereof are inclusive or open-ended terms that do not exclude additional, unrecited elements or method steps. “Comprising” is to be interpreted as including the more restrictive terms “consisting of” and “consisting essentially of.”

As used herein, “tonal characteristics” includes any of the characteristics such as timbre, pitch, tonal consistency, evenness, tone quality, focus, clarity, character, warmth, centering, and/or depth of sound.

As used herein, “body” includes any part of the wind instrument used for the generation of sound, or the surface along which, or through which, the sound resonates and/or travels. That is, the body will include the structure through which the forced air and/or sound vibrations flow. The body may include, for example, the mouthpiece, the neck, the body tube, the valve(s), the bell, the bow, and the like. For example, if the woodwind instrument is a saxophone, the body of the instrument includes the reed, neck, body tube, bow and bell.

As used herein, “key mechanism” includes the key and the pieces that are coupled to, or function with the key to facilitate the opening and/or closing of a tone hole.

As used herein, “water key” includes any water key such as, for example, spit valves, amatos, and the like.

As used herein, “wind instrument” includes any instrument in which column of air is put into vibration by a player blowing into or over a mouthpiece. Wind instruments include, for example, woodwinds and brass instruments.

As used herein, “woodwind instrument” includes any instrument in which sound is produced by blowing through a mouthpiece against an edge or a vibrating reed. The pitch may be varied by opening or closing holes in the body of the instrument. “Woodwind instrument” is a class definition, and does not necessarily restrict the class to instruments made of wood. As such, woodwind instruments may be constructed of any material suitable for construction of a wind instrument. Some examples of woodwind instruments include: single-reed woodwinds such as arghul, aulochrome, basset horn, clarinet, E-flat clarinet, alto clarinet, bass clarinet, contra-alto clarinet, contrabass clarinet, launeddas, mijwiz, rothphone, sarrusophone, saxophone, soprillo, sopranino saxophone, soprano saxophone, alto saxophone, tenor saxophone, C melody saxophone, baritone saxophone, bass saxophone, contrabass saxophone, subcontrabass saxophone, tubax, tárogáto and the like; double-reed woodwinds such as bassanelli, bassoon, contrabassoon, bombarde, duduk, dulcian, dulzania, guan, heckelphone, piccolo heckelphone, hojok, mizmar, nadaswaram, oboe, piccolo oboe, oboe d'amore, English horn, oboe da caccia, racket, shawm, shehnai, suona, surnay, tromboon, trompeta china, zurna, bagpipes, cornamuse, crumhorn, hirtenschalmei, kortholt, rauschpfeife, and the like; and flutes such as bansuri, flute, fife, piccolo, Western concert flute, alto flute, bass flute, contrabass flute, ryuteki, hocchiku, kaval, ney, quena, shakuhachi, flageolet, gemshorn, ocarina, recorder, tin whistle, penny whistle, tonette, and the like.

As used herein, “brass instrument” includes any instrument in which sound is produced by vibration of the lips as the player blows into a resonator, and are thus also known as labrosones. Brass instruments have various general ways of varying the tone. In one class of brass instruments, the tone is varied only by increasing or decreasing the rate of vibrations of the lips. In such instruments, the only available tones are those in the harmonic series of the instrument. On example of such an instrument is the bugle. In a third class of brass instruments, the tone may be varied by changing the length of the tubing using a slide. One example of such an instrument is the trombone. In yet another class of brass instruments, the tone may be varied by covering and/or uncovering holes along the body of the instrument. One example of such an instrument is the cornetto. Brass instrument may also vary tone by using a combination of the above techniques. "Brass instrument" is a class definition, and does not necessarily restrict the class to instruments made of brass. As such, brass instruments may be constructed of any material suitable for construction of a wind instrument. Some examples of brass instruments include: trumpets, bass trumpets, flumpets, French horns, tubas, Wagner tubas, trombones, superbones, bugles, sousaphones, mellophones, euphoniums, flugelhorns, saxhorns, cornets, cornetto, serpents, sackbuts, bazookas, horns, ophicleides, didgeridoos, shofars, conches, alphorns, cimbassos, keyed trumpets, and the like.

As used herein, "region" is interchangeable with "surface" when indicating a concave surface, tone-rich region, convex surface, non tone-rich region, and the like.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

FIG. 1 illustrates a side view of a wind instrument 100 according to one embodiment of the present invention. The embodiment illustrated in FIG. 1 is a wind instrument 100 typically known as a trumpet. The wind instrument 100 includes a mouthpiece (not shown) which attaches to the mouthpiece section 102 with which a player interfaces to vibrate a column of air, thereby producing sound. The wind instrument further includes keys 104 which a player may depress to lengthen the length of tubing through which the vibrating column of air moves, thereby varying the sound. The wind instrument includes valves in valve housings 106 which function in conjunction with the keys 104 to vary the length of tubing. The wind instrument includes a bell 110 from which sound emerges. The wind instrument further includes a return section 108 of tubing through which the vibrating column of air moves. The wind instrument also has a water key 114 through which moisture that may be trapped in the tubing of the instrument may be released from the instrument. The water key 114 includes a lever 112 that, when depressed, opens the valve, thereby allowing the moisture to escape.

The water key 114, as illustrated in FIG. 1, is located on the lower surface of the body of the instrument. The lower surface may include the surface extending from the lower lip of the player, when the instrument is held in typical playing position. The upper surface may be the surface that is not the lower surface. Alternatively, the upper surface may be the surface extending from the upper lip of the player, when the instrument is held in typical playing position.

Figure 2:
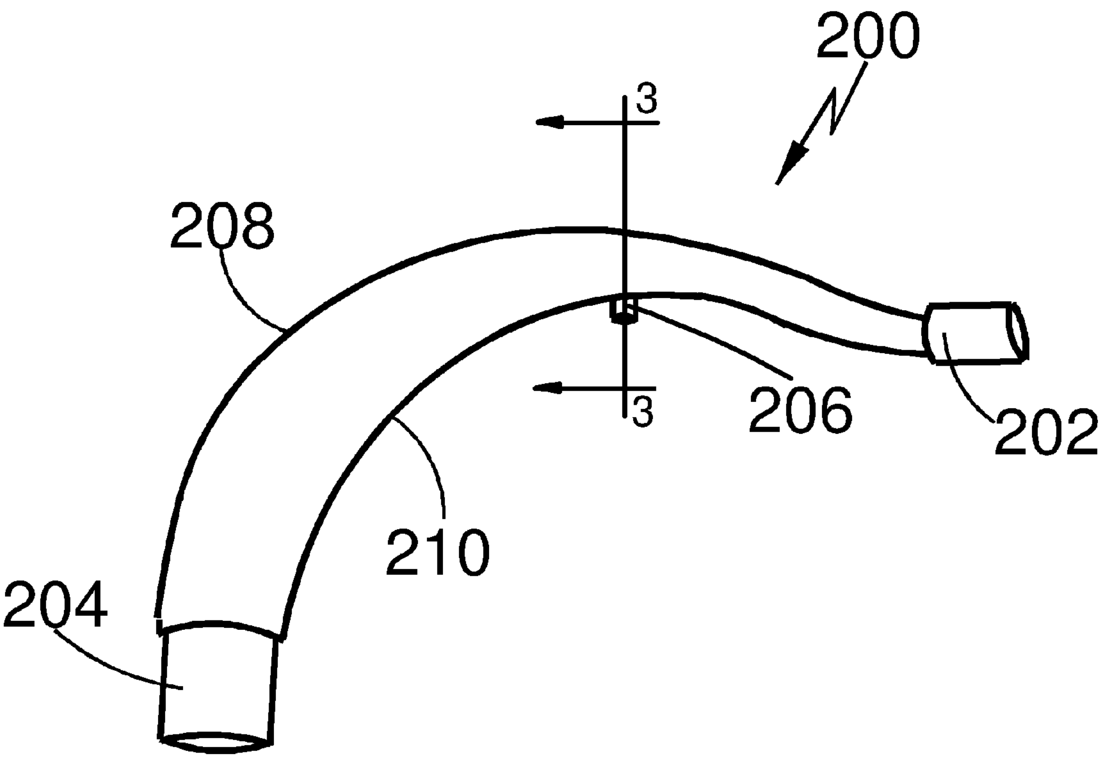
FIG. 2 illustrates a side perspective view of the neck of a wind instrument according to one embodiment of the present invention.

FIG. 2 illustrates a neck 200 of a wind instrument according to one embodiment of the present invention. The illustrated neck 200 may be the neck 200 of a woodwind instrument such as a saxophone. The neck 200 may include a mouthpiece area 202 which is configured to couple to, or be a mouthpiece. The neck 200 may include a tenon 204 configured to couple to a body tube of the wind instrument. In the illustrated embodiment, the tenon 204 is configured to fit inside the body tube of the wind instrument, but it is envisioned that the tenon 204 may fit on the outside of the body tube of the wind instrument. The neck includes an upper surface 208 opposite a lower surface 210. On the lower surface 210 is an octave hole 206. The octave hole 206 may function such that when it is uncovered, the identical configuration of depressed keys may play a higher tone.

The upper surface 208 may have an alternative definition for different instruments. Generally, the body of a wind instrument includes a center axis extending through the center of the body. If the body includes curves, the upper surface 208 will be the surface which includes an axis running substantially parallel to the center axis, but is longer than the center axis. The lower surface 210 will be the surface which includes an axis running substantially parallel to the center axis, but is shorter than the center axis. As a result, the lower surface 210 will typically exist on the substantially concave surface of a curve. Thus, the upper surface 208 may change from being the surface closest to or furthest from the player as the body of the wind instrument curves in varying directions.

It is theorized, but not meant to be limiting to the present invention, that wind instruments include a tone-rich region. The tone-rich region is a surface of the body of the instrument, wherein, when the surface is modified, the tonal characteristics of the instrument change. The tone-rich region may be limited to a small region, or a large region. The tone-rich region may include a region that has varying degrees of tone-richness. The size of the cross section of the tone-rich surface may vary along the body of the instrument. For example, it has been observed that when the water key of a trumpet is moved from its typical location on the upper surface of the return, to a side surface on the return, certain tonal characteristics are improved. Thus, the tone-rich region may be the upper surface 208 of the trumpet because when the upper surface 208 is modified by removing the water key, the tonal characteristics of the instrument are changed.

Figure 3:
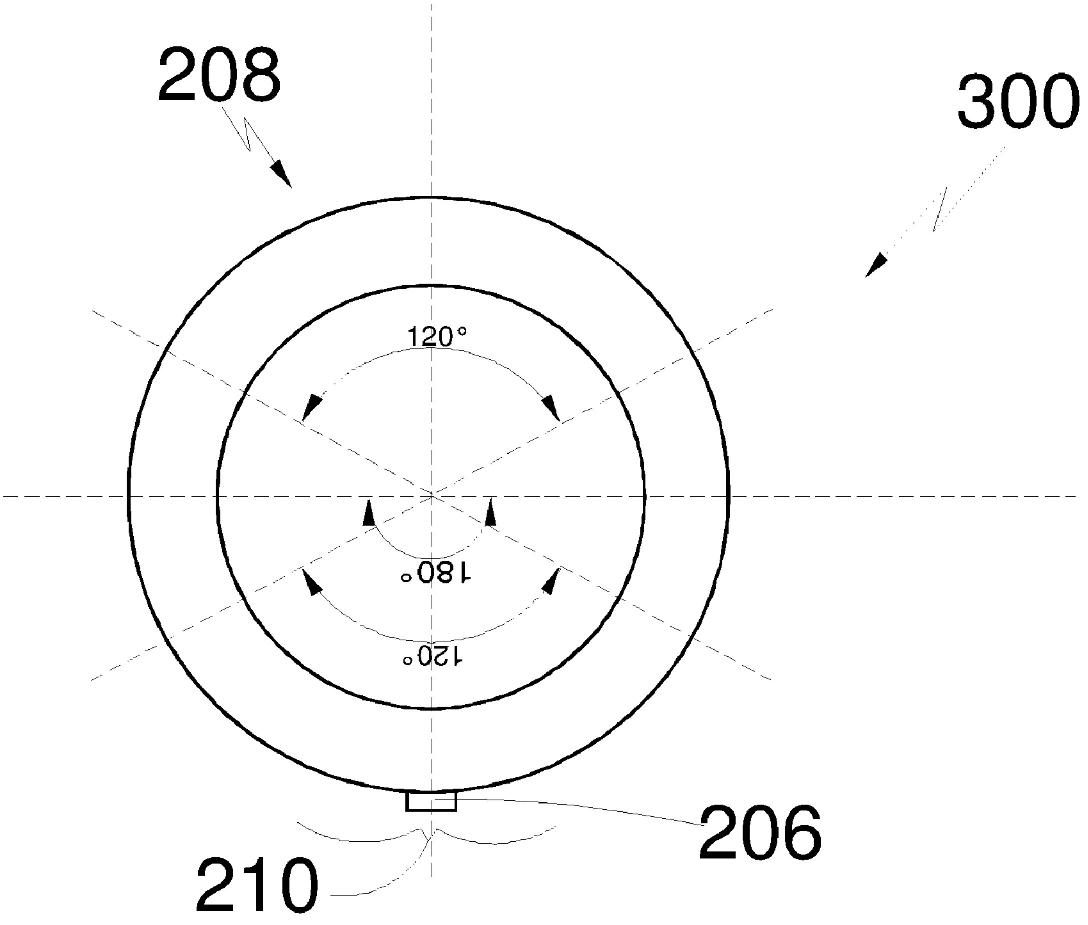
FIG. 3 illustrates a cross-sectional view of a wind instrument according to one embodiment of the present invention.

FIG. 3 illustrates a cross section of a body 300 of a wind instrument such that the upper and lower surface of the body 300 of the wind instrument may be better described according to the present invention. The illustrated octave hole 206 is located on the lower surface 210 of the body 300. Opposite the lower surface 210 is the upper surface 208 of the body 300. In one embodiment, the lower surface 210 includes 180° of the cross section of the body 300. In another embodiment, the lower surface 210 includes 120° of the cross section of the body 300. In yet another embodiment, the lower surface 210 includes all but the upper 120° of the cross section of the body 300. In a further embodiment, the upper surface includes 120° of the cross section of the body 300. The octave hole 206 may be located on the lower surface 210 of the body 300. In another embodiment, the octave hole 206 is not located on the upper surface 208 of the body 300.

Figure 4:
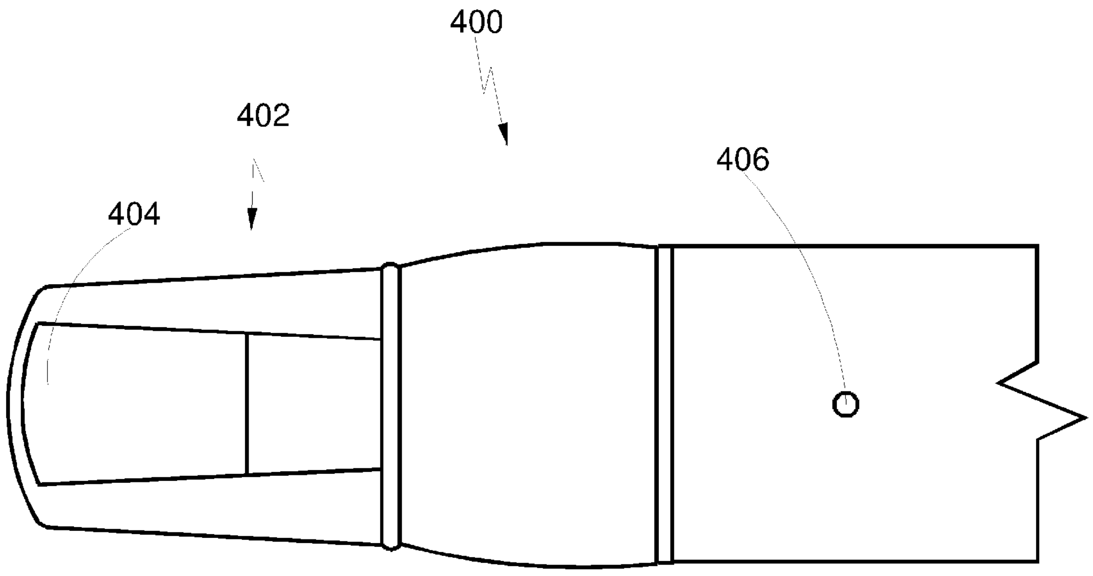
FIG. 4 illustrates a bottom plan view of a mouthpiece of a wind instrument according to one embodiment of the present invention.

FIG. 4 illustrates a plan view of a neck 400 of a woodwind instrument according to a particular embodiment of the present invention. The neck 400 includes a mouthpiece 402. The mouthpiece 402, includes a reed 404. On the same side of the neck 400 that includes the reed 404, the neck 400 may include an octave hole 406. It is theorized that by placing the octave hole 406 on the same side of the neck 400 as the reed 404, at least one of the tonal characteristics of the instrument are improved. For example, at least one of the tonal characteristics of the wind instrument may be improved by including an octave hole 406 on the same side of the neck 400 as the reed 404 instead of having the octave hole on the opposite side of the neck 400 as the reed 404.

Figure 5:
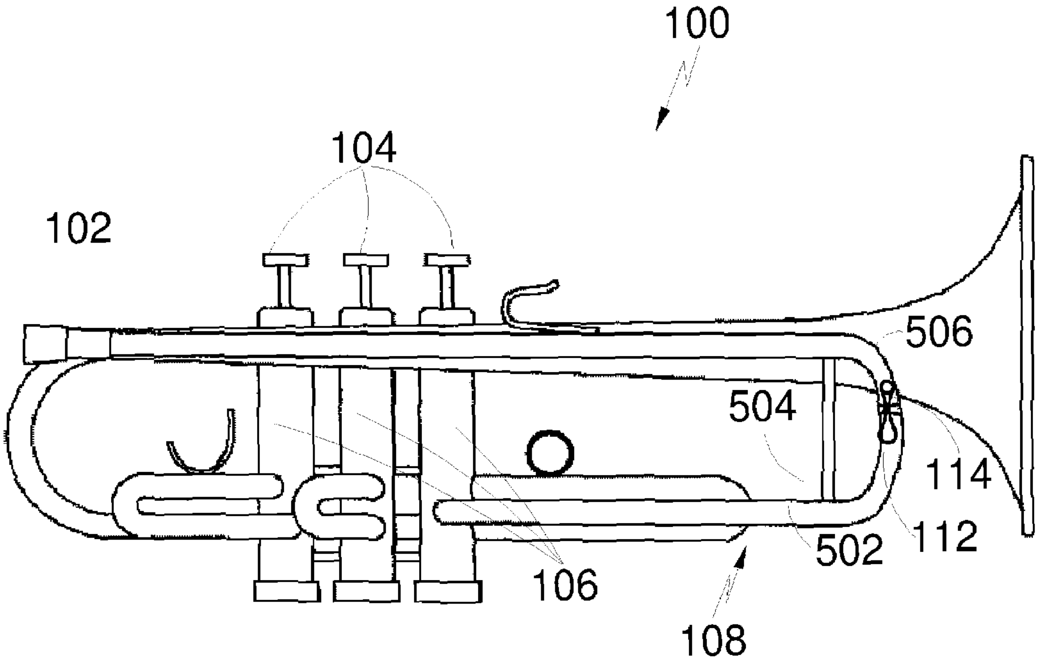
FIG. 5 illustrates a side plan view of a wind instrument according to one embodiment of the present invention.

FIG. 5 illustrates a side perspective view of a brass instrument 100 according to one embodiment of the present invention. The brass instrument includes a mouthpiece section 102 following to a return side 108. The brass instrument may include keys 104 and valve housings 106, as described hereinabove. On the return side 108 of the brass instrument 100 is a water key 114. The water key 114 includes a lever 112 which, when pushed, opens the water key 114 such that the moisture in the brass instrument 100 may escape. The water key 114 is not located on the upper surface 502 of the return side 108 of the brass instrument 100. The water key is located on a lower surface 506 of the return side 108 of the brass instrument 100. It is theorized that by removing the water key 114 from the upper surface 502 of the return side 108 of the brass instrument 100, at least one of the tonal characteristics of the brass instrument is improved.

In one embodiment of the present invention, there is provided an octave hole on the lower surface of a neck. There is also a key mechanism that opens the octave hole using the same motion as is provided by depressing the octave key button of a typical saxophone. On a typical saxophone, when the octave key button is depressed by the player, a lever which contacts the octave key forces the octave key in a direction away from the lower surface of the neck, thereby causing the octave key mechanism to open the octave hole. According to the present embodiment, the octave key mechanism similarly opens the octave hole on the lower surface of the neck by receiving a force from the octave key button in a direction away from the lower surface of the neck. Thus, the neck of the present embodiment may be used with a typical saxophone, and the octave hole uncovered using the typical fingering and motions of a saxophone, without the need to modify the key mechanisms of the typical saxophone. This embodiment is further illustrated in FIGS. 6-8.

Figure 6:
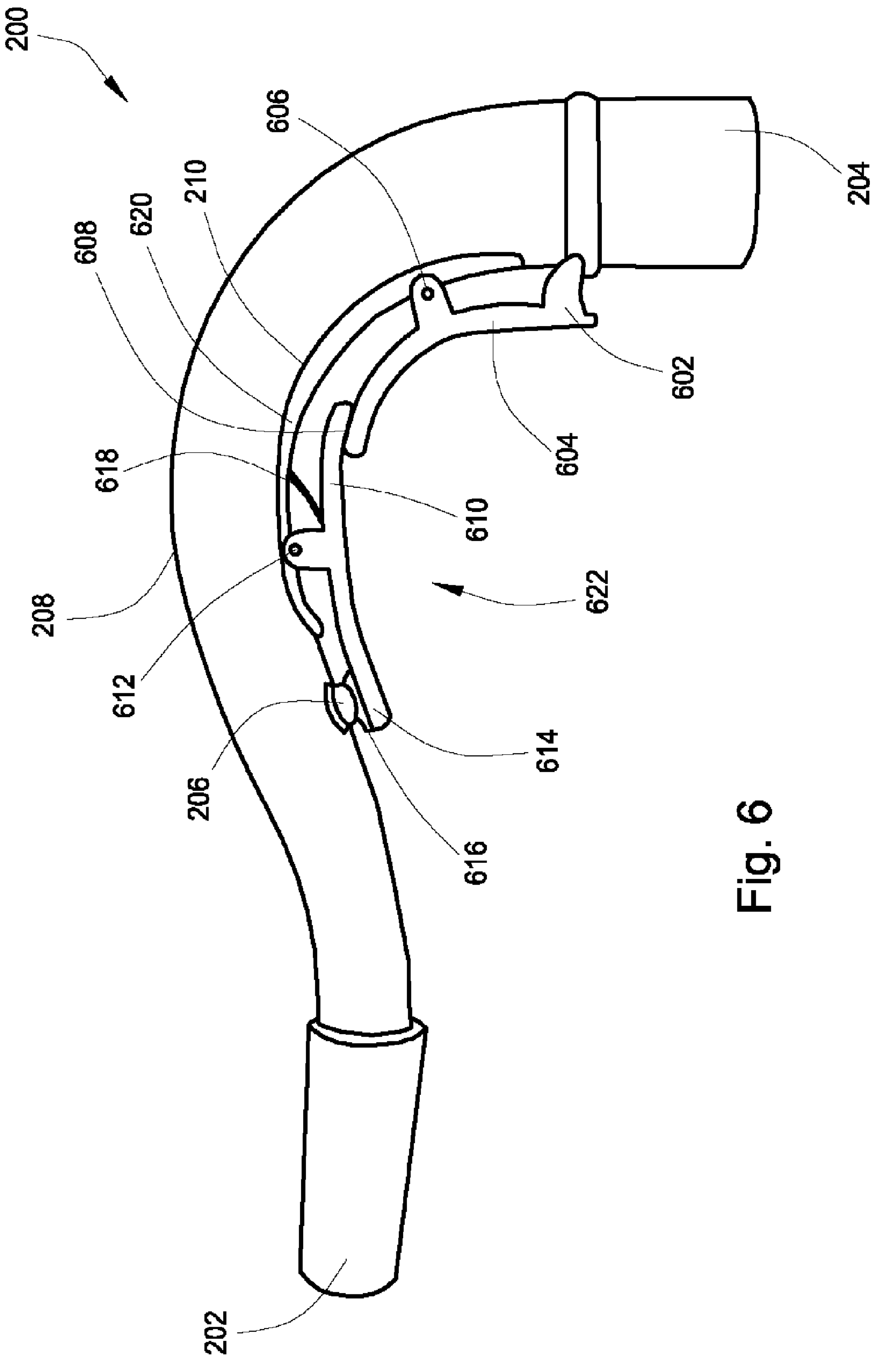
FIG. 6 illustrates a side perspective view of a neck of a wind instrument and its key mechanism according to one embodiment of the present invention.

FIG. 6 illustrates a side perspective view of a neck 200 of a wind instrument according to one particular embodiment of the present invention. The illustrated neck 200 includes a mouthpiece area 202 and a tenon 204. The neck 200 further includes an upper surface 208 and a lower surface 210. The lower surface 210 is the concave surface. The neck 200 further includes an octave hole 206 located on the lower surface 210 of the neck 200. The neck 200 further includes an octave key 602 located in generally the same area as the octave key of a typical saxophone. The octave key 602 is configured to uncover the octave hole 206 when the octave key 602 is maneuvered away from the lower surface 210 using the same fingering as that used to uncover the octave hole by the octave key mechanism of a typical saxophone. That is, according to the presently illustrated embodiment, when the octave key 602 is maneuvered in the same way as the octave key of a typical saxophone, the octave hole 206 is uncovered as it is in a typical saxophone. As the octave key 602 is maneuvered away from the lower surface 210 of the neck 200, the key mechanism 622 functions such that the octave hole 206 is uncovered. This serves a particular advantage in that a new fingering is not needed to uncover the octave key 206 of the present embodiment. A player who is accustomed to playing a typical saxophone will be able to play a saxophone with a neck according to the presently illustrated embodiment without changing the way in which he is accustomed to playing the typical saxophone, including the fingering to uncover the octave hole 206. Thus, the advantages of having an octave hole 206, and/or key mechanism on the lower surface 210 of the neck 200 may be experienced without the need to re-learn a new fingering technique to uncover the octave key 206.

The particular functioning and mechanism behind the octave key mechanism 622 is presently described. The illustrated octave key mechanism 622 includes a first lever 604, which includes an octave key 602 at one end, and a contact point 608 on the other end. Between the octave key 602 and the contact point 608 there is a first pivot point 606. The first pivot point 606 allows for the octave key 602 to move toward and/or away from the lower surface 210. The pivot point may be mounted on a pivot support 620. The pivot support 620 may be mounted on the lower surface 210 of the neck 200, and may include an aperture through which a pin may be placed. The pin may extend through the first pivot point 606 of the first lever 604 and the pivot support 620. The pin may allow the first lever 604 to rotate about the first pivot point 606 such that when the octave key 602 is maneuvered away from the lower surface 210 of the neck 200, the contact point 608 is moved toward the lower surface 210 of the neck 200; and when the octave key 602 is maneuvered toward the lower surface 210 of the neck 200, the first lever 604 may rotate about the first pivot point 606 such that the contact point 608 moves away from the lower surface 210 of the neck 200.

The contact point 608 further contacts a second lever 610, with the contact point 608 existing on one end of the second lever 610, and an octave hole cover 614 being located on the opposite end of the second lever 610. Between the contact point 608 and the octave hole cover 614 of the second lever 610 is a second pivot point 612. The second pivot point 612 is configured such that when the contact point 608 is maneuvered toward the lower surface 606 of the neck 200, the second lever 610 rotates about the second pivot point 612 such that the hole cover 614 moves away from the octave hole 206. Further, as the contact point 608 is maneuvered away from the lower surface 606 of the neck 200, the second lever 610 rotates about the second pivot point 612 such that the hole cover 614 moves toward the octave hole 206. The hole cover 614 may include a cover pad 616 which may contact the octave hole 206 when the contact point 608 is not maneuvered toward the lower surface 210 of the neck 200. The second pivot point 612 may be on the pivot support 620, and may be configured in the same way as the first pivot point 606 of the first lever 604.

There may further be a biasing mechanism 618 connected to the octave key mechanism 622 which biases the octave key mechanism 622 such that the octave hole 206 is either covered or uncovered in a position when no part of the key mechanism 622 is maneuvered. In the illustrated embodiment, the biasing mechanism 618 is a spring which provides a force in a direction away from the lower surface 210 of the neck 200. The force may be provided on the second lever 610 at a point between the pivot point 618 and the contact point 608. Such a force will further force the contact point 608 away from the lower surface 210 of the neck, and thereby also force the hole cover 614 toward the octave hole 206. The biasing mechanism 618 may be made of a spring metal with one end contacting the lower surface 210 and/or the pivot support 620, and the other end contacting the second lever 610 at a point between the second pivot point 612 and the contact point 608.

The currently illustrated neck 200 would not require a player to learn a new fingering when playing, would not interfere with the key structures of the body tube of the instrument to which the neck 200 may be coupled. The octave key 602 is located in the same area as the octave key 602 of a typical saxophone. Further, the octave key 602 functions such that when it is maneuvered away from the lower surface 210 of the neck 200 the octave hole 206 is uncovered.

Figure 7:
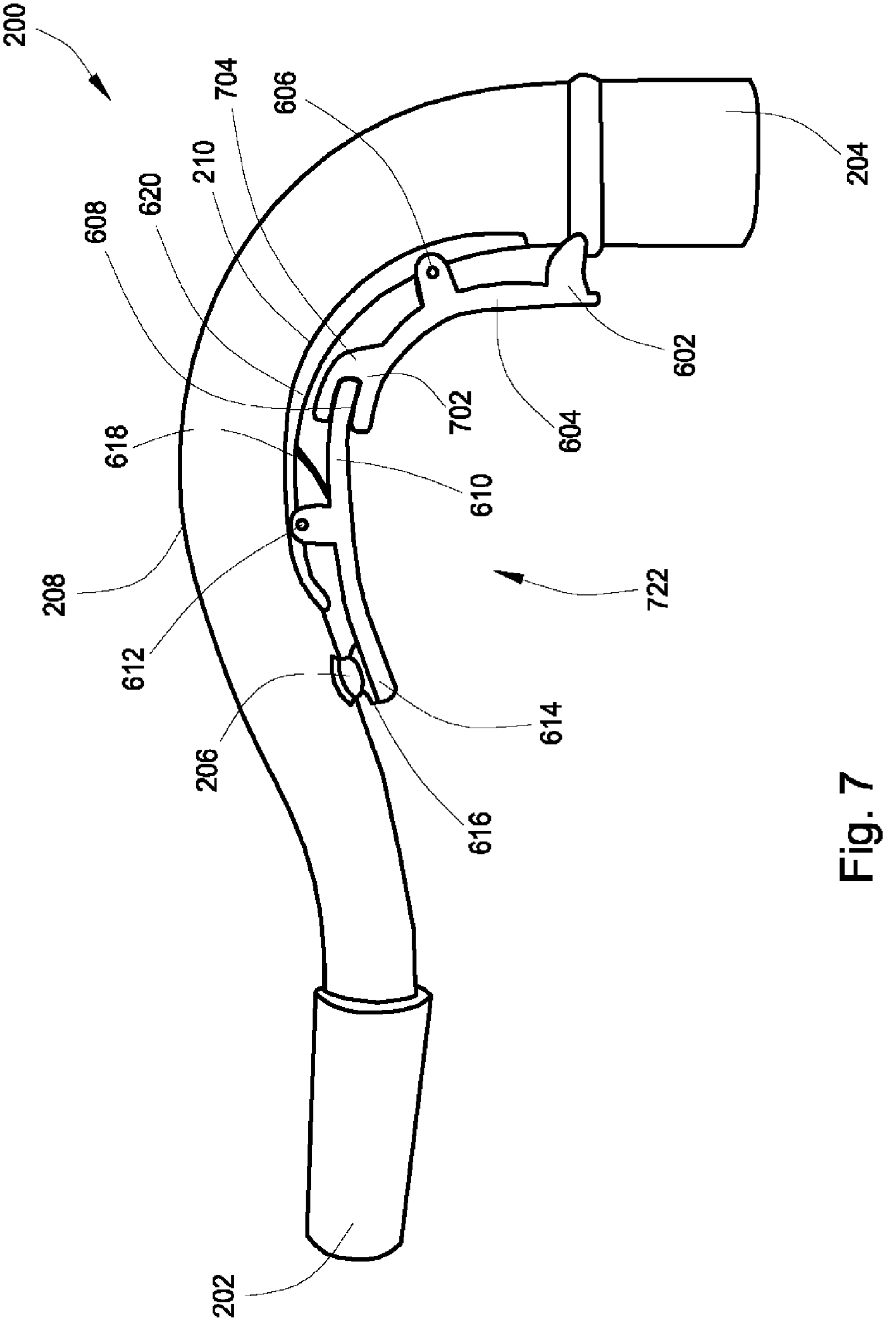
FIG. 7 illustrates a side perspective view of a neck of a wind instrument and its key mechanism according to one embodiment of the present invention.

FIG. 7 illustrates a side perspective view of a neck 200 of a wind instrument according to one embodiment of the present invention. The neck includes an octave hole 206 located on the lower surface 210 of the neck 200, as with the neck illustrated in FIG. 6. The key mechanism 722 illustrated is also much the same as the key mechanism 622 illustrated in FIG. 6. The key mechanism 722 of the presently illustrated embodiment, however, includes a clasp 702 at the end of the first lever 604 that also includes the contact point 608. The clasp 614 includes a second arm 704 that extends over a portion of the second lever 610 opposite the contact point 608. The key mechanism 722 of the presently illustrated embodiment may function in much the same way as the key mechanism 622 illustrated in FIG. 6. The presently illustrated key mechanism 722 includes a further feature that when a force is provided on the octave key 602 toward the lower surface 210 of the neck 200, the second arm 704 will in turn provide a force away from the lower surface 210 of the neck 200 on the end of the second lever 610 commensurate with the contact point 608. This will in turn force the octave hole cover 614 toward the octave hole 206. This force may be useful in ensuring that none of the air of the vibrating column of air inside of the wind instrument escapes through the octave hole 206.

Figure 8:
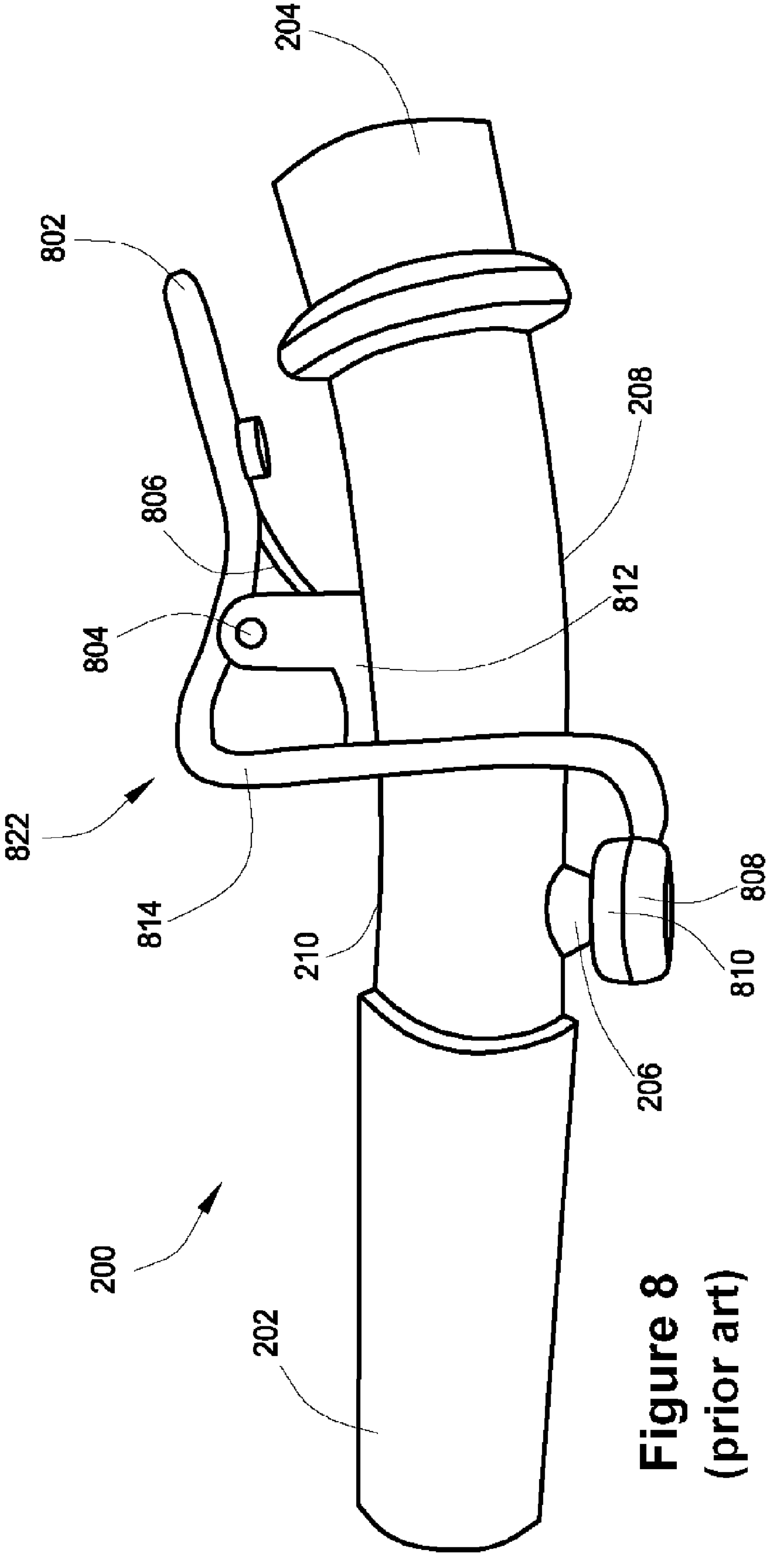
Figure 8 (prior art)
FIG. 8 illustrates a side perspective view of a neck of a wind instrument and its key mechanism according to one embodiment of the prior art.

In the prior art, illustrated in FIG. 8, is a neck 200 of a soprano saxophone with a mouthpiece portion 202 and a tenon 204. The upper surface 208 includes a key mechanism 822 that is not substantially located on the upper surface 208, and is instead disposed on the lower surface 210, while the octave hole 206 is disposed on the upper surface 208 of the neck 200. FIG. 8 illustrates a side plan view of this embodiment. In the illustrated embodiment, the octave hole 206 is not located on the lower surface 210, but instead on the upper surface 208. The neck also includes a key mechanism 822 which does not have any pieces directly contacting the upper surface 208. The illustrated embodiment includes a key mechanism 822 connected to the neck 200 through a pivot point 804 which is coupled to the neck 200 by means of a pivot point structure 812. The key mechanism 822 includes a lever 814 which includes an octave key 802 on one end, and on the opposite end an octave hole cover 808. The lever 814 connects to the neck 200 through the pivot point 804 such that the lever 814 may rotate around the pivot point 804 as pressure is applied to the octave key 802. The pivot point 804 may be configured as the other pivot points herein described are configured.

The presently illustrated embodiment functions such that when a pressure is applied to the octave key 802 in a direction away from the lower surface 210, the lever 214 rotates about the pivot point 804 such that the octave hole cover 808 moves away from the octave hole 206, thus uncovering the octave hole 206. The octave hole cover 808 may include a pad 810 that conforms to the shape of the octave hole 206 such that when covered, air is less likely to escape through the octave hole 206.

The key mechanism 822 may include a biasing mechanism 806. The biasing mechanism may function to bias the key mechanism to either open or close the octave hole 206 when no other force is applied to the octave key 802. In the presently illustrated embodiment, the biasing mechanism 806 includes a spring with one end contacting either the pivot support 812 or the lower surface 210 of the neck 200. The other end of the biasing mechanism 806 may contact a point of the lever 814 between the pivot point 804 and the octave key 802. Thus, the biasing mechanism 806 will force the octave key 802 either toward or away from the lower surface 210 of the neck 200. In a particular embodiment, the biasing mechanism 806 applies a force to the lever 814 such that the octave hole cover 808 closes the octave hole 206. In this embodiment, only when a force greater than that provided by the biasing mechanism 806 is applied to the octave key 802 in a direction away from the lower surface 210 of the neck 200, will the key mechanism 822 function to uncover the octave hole 206.

Figure 9:
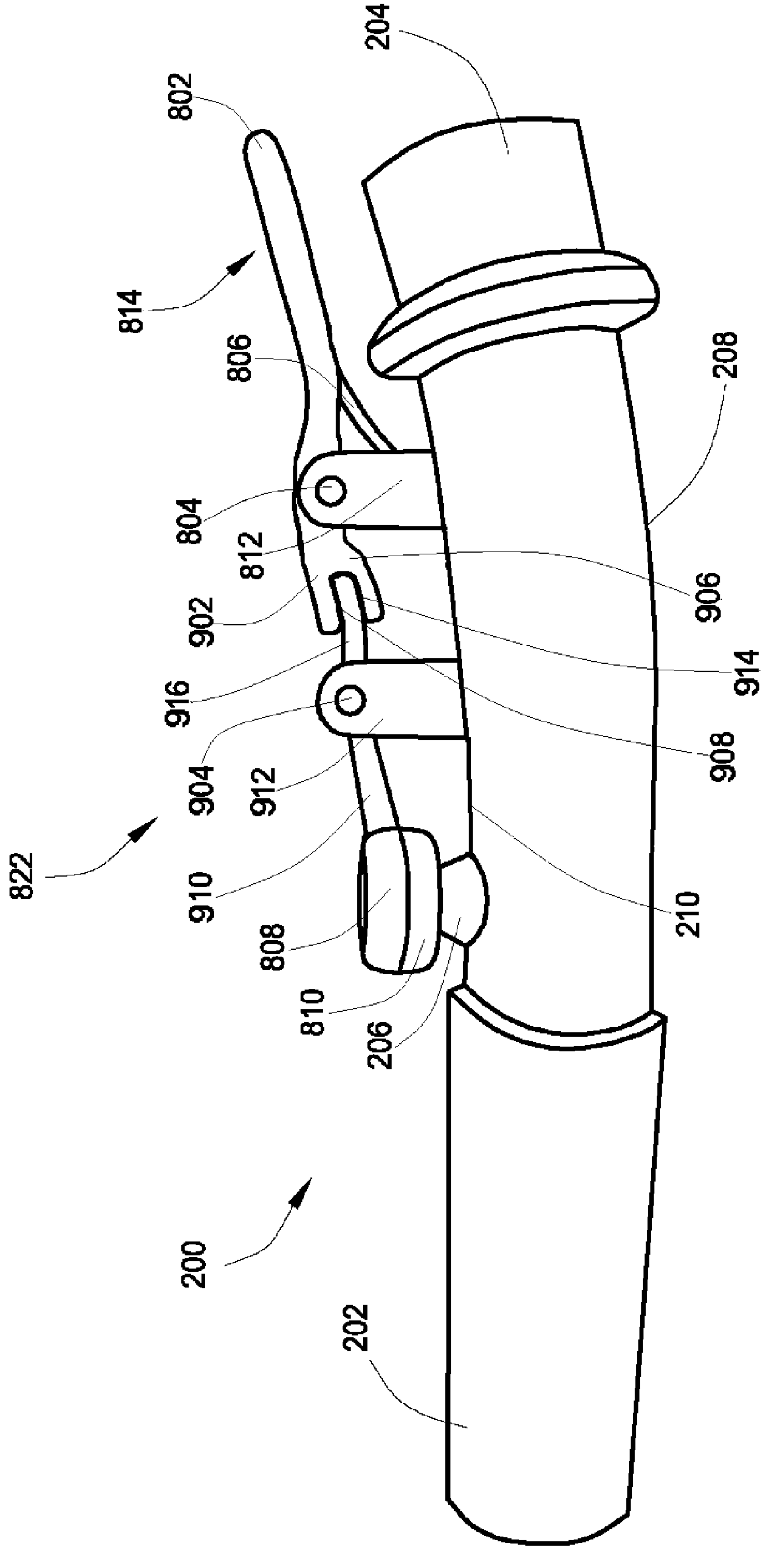

FIG. 9 illustrates an octave hole 206 and a key mechanism 822 according to one embodiment of the present invention. The presently illustrated embodiment illustrates the neck 200 of a soprano saxophone. The neck includes a mouthpiece section 202 for connection to a mouthpiece, and a tenon 204 for connection to a wind instrument such as a soprano saxophone. The neck 200 includes an upper surface 208, which may be the tone-rich region of the neck. The octave hole 206 is not located on the upper surface 208, but is instead located on the lower surface 210. According to the illustrated embodiment, the key mechanism 822 includes a first lever 814 with an octave key 802 disposed on one end thereof, and a first contact point 908 on the other end thereof. The octave key 802 is disposed on an end of the first lever 814 that is closer to the tenon 204 than the contact point 908. Between the octave key 802 and the first contact point 908 is a pivot point 804 allowing the lever 814 to pivot about the pivot point 804 such that when the octave key 802 is pushed away from the tenon 204, the first contact point 908 is pushed toward the lower surface 210 of the neck 200. The pivot point 804 may be located on a first pivot point structure 812 which contacts the lower surface 210 of the neck 200. Also illustrated is a biasing mechanism 806 contacting the lever 814 between the first pivot point 804 and the octave key 814, and also contacting the lower surface 210 of the neck 200 and/or the first pivot point structure 812. The biasing mechanism 806 may provide a force on a point on the first lever 814 toward the lower surface 210 of the neck 200.

The illustrated key mechanism also includes a second lever 916 contacting the first lever 814 at the first contact point 908. The second lever 916 also includes an octave hole cover 808 disposed an opposite end from the first contact point 908. Between the first contact point 908 and the octave hole cover 808 there is a second pivot point 904 on the second lever 916. The second pivot point contacts a second pivot point structure 912 such that the second lever 916 may pivot about the second pivot point 904 such that when the first contact point 908 is pushed toward the lower surface 210 of the neck 200, the octave hole cover 808 is pushed away from the lower surface 210 of the neck 200. The octave hole cover 808 is disposed over the octave hole 201 such that it may cover the octave hole 808. The octave hole cover 808 may include a pad 810 that conforms to the shape of the octave hole 206 such that when covered, air is less likely to escape through the octave hole 206.

It has been found that if the second lever 916 were substantially straight, the octave hole cover 808 even with a pad 810 may not satisfactorily cover the octave hole 206. Thus, in the illustrated embodiment, the second lever 916 includes an angled portion 910 between the second pivot point 904 and the octave hole cover 808. The angled portion 910 slopes generally toward the lower surface 210 of the neck 200 such that the distance between the pivot point 904 and the lower surface is shorter than the distance between the octave hole cover 808 and the lower surface 210. Thus, this angled portion 910 is not parallel to the lower surface 210 when the octave hole cover 808 is positioned on the octave hole 206. The octave hole cover 808, however, may be substantially parallel to the lower surface 210.

The first contact point 908 is configured such that when the octave key 802 is pushed away from the lower surface 210, the first contact point 908 is pushed toward the lower surface 210, thus pivoting the second lever 916 such that the first contact point 908 is pushed toward the lower surface 210, and the octave cover 808 is pushed away from the lower surface 210, opening the octave hole 206. The biasing mechanism 806 works to force the octave key 802 toward the lower surface, in turn releasing the octave hole cover 808 to cover the octave hole 206.

To assist in forcing the octave hole cover 808 to cover the octave hole 206, there may be a second contact point 914 between the first and second levers 814 916 disposed on the second lever 916 on a side thereof opposite the first contact point 908. This second contact point 914 may provide a force on the second lever 916 such that the second contact point 914 is pushed away from the lower surface 210 when the octave key 802 is pushed toward the tenon 204 (for example, by the biasing mechanism 806), thus forcing the octave hole cover 808 toward the octave hole 206. This may help the octave hole cover 808 to return to the position of covering the octave hole 206 when the octave key 802 is not forced away from the tenon 204. The second contact point 914 may be provided by an arm 906 extending from the first lever 814 over a portion of the second lever 916. The arm 906 may form a clasp around a portion of the second lever 916.

Figure 10:
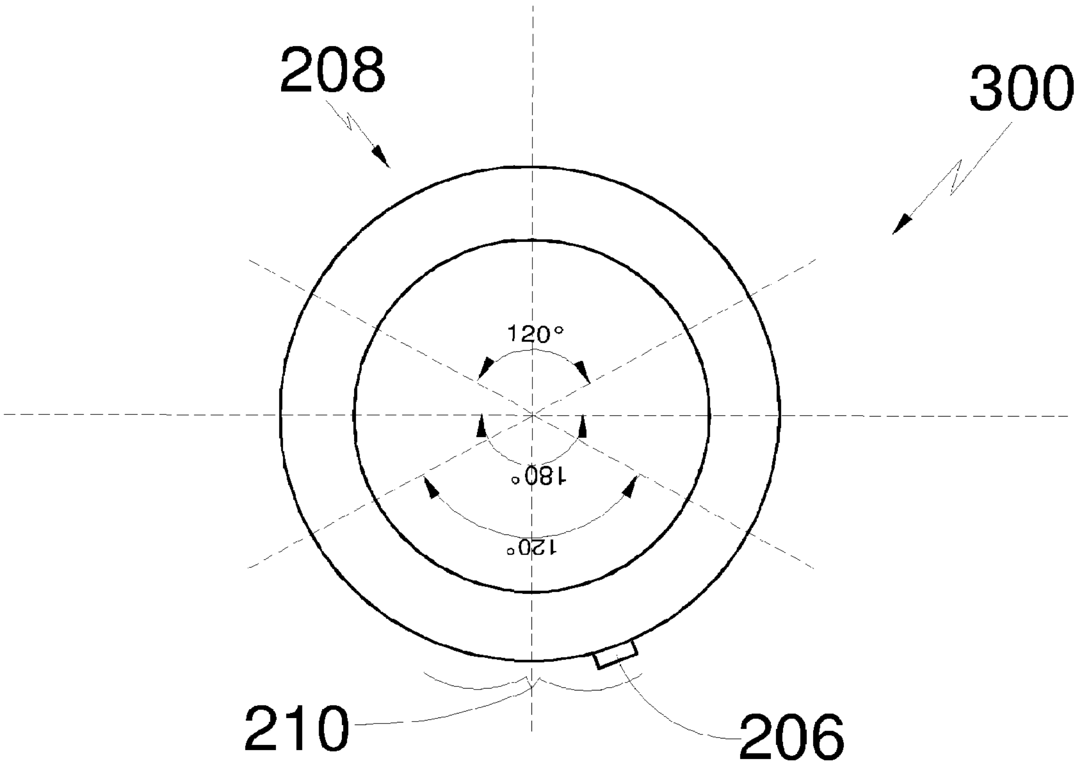
FIG. 10 illustrates a cross-sectional view of a wind instrument according to one embodiment of the present invention.

In one embodiment, the present invention includes a method of improving a tonal characteristic of a wind instrument. As has been described above, a tonal characteristic of a wind instrument may be improved by placement of an aperture such as an octave key or a water key or a mechanism such as a key mechanism on a surface that is not a tone-rich region. The method includes the steps of determining the location of the tone-rich region of the instrument. Once the location of the tone-rich region is determined, the aperture or mechanism may be placed on a surface that is not the tone-rich region. In one embodiment, the wind instrument is a saxophone. The tone rich surface of the neck is determined to be the surface leading from the upper lip of the player as the instrument is played in its normal position. The octave hole is then placed on the surface of the neck that is not the tone-rich region. In one embodiment, the octave hole is placed opposite the tone-rich region. In another embodiment, the octave hole is placed on a surface which includes about 120° of a circumference of the cross section of the neck opposite the tone-rich region. In yet another embodiment, as illustrated in FIG. 10, the octave hole 206 is placed on a lower surface 210 which includes about 120° of a circumference of the cross section of the neck opposite the tone-rich region 208, but the octave hole 206 is not located directly opposite of the center of the tone-rich region 208, but is located between 90° and 180° from the center of the tone-rich region 208.

The tone-rich region may be located in several ways. The tone-rich region may be located by determining which surface includes a line of curvature that runs parallel to a central axis of the instrument, but is longer than the central axis of the instrument. The tone-rich region may be located by testing with known techniques which surface along a cross-section of the instrument has a maximum of vibration as the instrument is played.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

The octave key 602, 608 of the above embodiments may be a key manipulated by a player, and/or a key that is manipulated by a key mechanism. A typical saxophone may have an octave key mechanism on the body tube of the saxophone that is configured to coordinate with the octave key of a typical saxophone neck, such that when the octave key button is depressed by the player, the octave key mechanism of the body tube provides a force in a direction outward from the lower surface. The octave key mechanism of the neck of the present invention may be configured to receive said force from the octave key mechanism of the body tube, and thereby cause the octave hole 206 to be uncovered. The octave key 602, 608 of the key mechanism on the neck may be configured such that it couples with the octave key mechanism of the body tube though the neck be attached in a manner that the mouthpiece does not extend in a direction exactly 180° from the bell. For this purpose, the octave key 602, 608 may include a curved section extending circumferentially at least partially around the circumference of the body, but not touching the body, such that the octave key mechanism of the body tube may fit between the octave key 602, 608 and the body.

For example, although FIGS. 1 and 5 illustrate the water key at a particular location on the return of a brass instrument, it is envisioned that the water key may be located at any position on the body of a wind instrument, so long as it is not located on the upper surface of the body of the wind instrument. Alternatively, the water key may be located on the side surface of the body of a wind instrument. Further still, the water key may be located on the lower surface of the body of a wind instrument.

Although FIGS. 1 and 5 illustrated a brass instrument such as a trumpet having three valves, three valve keys 104 and three valve housings 106, the brass instrument may be any known in the art as described above. Further, brass instrument may be a trumpet. Trumpets may typically have from about 1 to about 4 valves. The valves may be any known in the art such as, for example, piston valves, rotary valves, and the like.

FIG. 2 illustrates a neck having an octave hole 206 on the lower surface. It is envisioned that the octave hole 206 may be on any part of the lower surface. The octave hole 206 may be located closer to the mouthpiece area 202. The octave hole may be located closer to the tenon 204. The octave hole 206 may be located on the side of the neck.

Though it is described that the lower surface may be the surface extending from the lower lip of the player, it is noted that players may turn the mouthpiece such that the lower lip does not coincide with the concave surface of the neck and/or body of the wind instrument. In such cases, the other definitions of the lower surface, and/or tone-rich region may be used to define the claims. Thus, the present invention will cover a saxophone with an octave hole on the concave surface of the neck, even if the mouthpiece is turned such that the lower lip is commensurate with the convex surface of the neck of the saxophone.

It should further be noted that though the figures may illustrate the octave hole 206 as being raised from the surface of the neck, the claims may cover any octave hole, unless otherwise indicated in the claim. For example, the octave hole may be flush with the surface of the neck. The octave hole may include a ridge extending outwardly from the surface of the neck. The octave hole may include a beveled edge extending below the surface of the neck.

Further, various drawings illustrate that the neck may include a tenon that is configured to couple with the body tube of the wind instrument. The illustrated tenons fit inside of the body tube of the wind instrument. However, it is envisioned that the tenon may fit over the outside of the body of the wind instrument. Alternatively, the tenon may fit flush with the body tube of the instrument.

Although FIG. 3 illustrates the octave hole 210 being located exactly in the middle of the 180° of the lower surface, it is envisioned that the octave hole 210 may be located at any point along the cross section of the lower surface. For example, if the lower surface consists of the 120° opposite of the upper surface 208.

It is envisioned that the octave hole may be covered by an octave hole cover. As illustrated, the octave hole cover may include a pad. The pad may be configured to conform to the shape of the octave hole cover. The pad may be formed from any material capable of conforming to the shape of the octave hole. Some examples of these materials include, for example, rubber, polymer, leather, paper, soft metal, metal alloy, wood, and the like.

It is also envisioned that the described biasing mechanisms may be any capable of biasing the key mechanism. For example, the biasing mechanism may pull instead of push. The biasing mechanism may be pneumatic. The biasing mechanism may be formed from any material usable for the purpose of biasing, such as, for example, metal, spring metal, metal alloy, polymer, fibers, rubber, leather, wood, and the like.

The described and illustrated pivots may include a mechanism provided to allow the levers to rotate around a point. The pivots may be substantially inverted, wherein the pin is located closer to the neck than the lever as illustrated. The pivot may include a rocker.

There may be a multiplicity of levers, pivots, and contact points, instead of the two illustrated in FIGS. 6 and 7, so long as when the octave key is forced away from the neck, the levers cause the octave hole to be uncovered. Alternatively, a single piece that bends may be used instead of a pair of levers. The contact point between the levers may be a pivot point between the levers. The second lever may be the one to include a clasp and/or a second arm, instead of the first lever as illustrated.

Though certain embodiments illustrate or describe a single lever, or two levers, it is envisioned that a multiplicity of levers may be used.

It is also envisioned that the octave key may be manipulated directly by a player, or secondarily manipulated. For example, the player may push a first octave key, and the first octave key may include a key mechanism that manipulates the octave key herein illustrated and described.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A wind instrument having a neck coupled to a body tube, in which a column of air may be vibrated to produce sound, wherein the neck comprises:

a tenon for coupling with the body tube;

a interior arc region of the neck;

an octave hole located on the interior arc region; and a key mechanism used to selectively uncover the octave hole; wherein the key mechanism, comprises:

a first lever, with an octave key on one end thereof, a contact point on another end thereof, and a pivot point between the octave key and the contact point, around which the first lever has rotational freedom; and a second lever, with a contact point on one end thereof, contacting the contact point of the first lever, an octave hole cover on the other end thereof positioned to cover the octave hole, and a pivot point between the contact point and the octave hole cover, around which the second lever has rotational freedom.

2. The wind instrument of claim 1, wherein the key mechanism includes a biasing mechanism for biasing the octave hole cover toward the octave hole.

3. The wind instrument of claim 1, wherein the octave key couples to an octave key mechanism of a body tube of the wind instrument.

4. The wind instrument of claim 1, wherein the first lever further comprises a clasp for contacting the second lever on two points.

5. The wind instrument of claim 1, wherein the instrument is one selected from the group consisting of: arghul, aulochrome, basset horn, clarinet, E-flat clarinet, alto clarinet, bass clarinet, contra-alto clarinet, contrabass clarinet, launeddas, mijwiz, rothphone, sarrusophone, saxophone, soprillo, sopranino saxophone, soprano saxophone, alto saxophone, tenor saxophone, C melody saxophone, baritone saxophone, bass saxophone, contrabass saxophone, subcontrabass saxophone, tubax, tárogáto, bassanelli, bassoon, contrabassoon, bombarde, duduk, dulcian, dulzania, guan, heckelphone, piccolo heckelphone, hojok, mizmar, nadaswaram, oboe, piccolo oboe, oboe d'amore, English horn, oboe da caccia, racket, shawm, shehnai, suona, surnay, tromboon, trompeta china, zuma, bagpipes, cornamuse, crumhorn, hirtenschalmei, kortholt, rauschpfeife, bansuri, flute, fife, piccolo, Western concert flute, alto flute, bass flute, contrabass flute, ryuteki, hocchiku, kaval, ney, quena, shakuhachi, flageolet, gemshorn, ocarina, recorder, tin whistle, penny whistle, tonette, trumpet, bass trumpet, flumpet, French horn, tuba, Wagner tuba, trombone, superbone, bugle, sousaphone, mellophone, euphonium, flugelborn, saxhorn, cornet, cornetto, serpent, sackbut, bazooka, horn, ophicleide, didgeridoo, shofar, conch alphorn, cimbasso, and keyed trumpet.

6. The wind instrument of claim 1, wherein the wind instrument is a saxophone.

7. The wind instrument of claim 1, wherein the neck includes a cross section that is substantially circular.

8. The wind instrument of claim 1, wherein the interior arc region includes no greater than 180° of a circumference of the substantially circular cross section of the body.

9. The wind instrument of claim 1, wherein the interior arc region includes no greater than 120° of a circumference of the substantially circular cross section of the body.

10. The wind instrument of claim 2, wherein the biasing mechanism includes a spring.

11. The wind instrument of claim 10, wherein the spring includes a first end contacting a pivot support or a lower surface of a neck of the wind instrument.

12. The wind instrument of claim 10, wherein the spring includes a second end contacting a point of lever between the pivot point and the octave key.

13. The wind instrument of claim 10, wherein the biasing mechanism disposes the octave key toward or away from the lower surface of the neck of the wind instrument.

14. The wind instrument of claim 1, wherein the octave hole is positioned on the lower surface of the neck of the wind instrument.

15. The wind instrument of claim 6, wherein the saxophone is a soprano saxophone.

16. The wind instrument of claim 1, wherein the octave hole cover includes a pad that conforms to the shape of the octave hole.

17. The wind instrument of claim 1, wherein the second lever includes an angled portion between the pivot point and the octave hole cover.

18. The wind instrument of claim 17, wherein the angled portion slopes towards the lower surface of the neck of the wind instrument.

19. The wind instrument of claim 18, wherein the angled portion is not parallel to the lower surface of the neck of the wind instrument when the octave hole cover is positioned on the octave hole.

* * * * *